Oct. 31, 1939.                C. D. STEWART                2,177,957
                              BRAKE MECHANISM
                           Filed Dec. 28, 1938            2 Sheets-Sheet 1
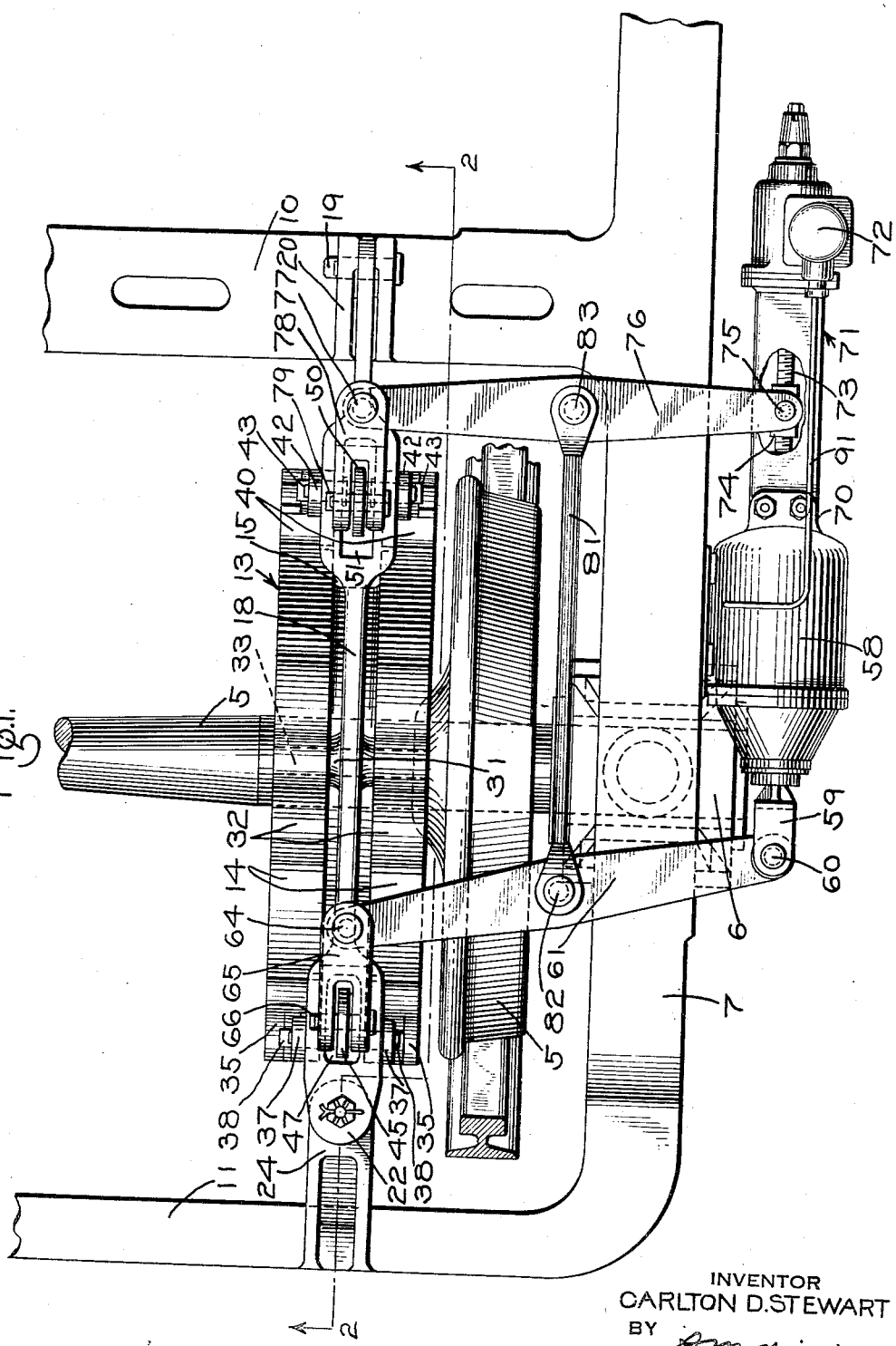
INVENTOR
CARLTON D. STEWART
BY
ATTORNEY Oct. 31, 1939.                C. D. STEWART                 2,177,957
                             BRAKE MECHANISM
                          Filed Dec. 28, 1938          2 Sheets-Sheet 2
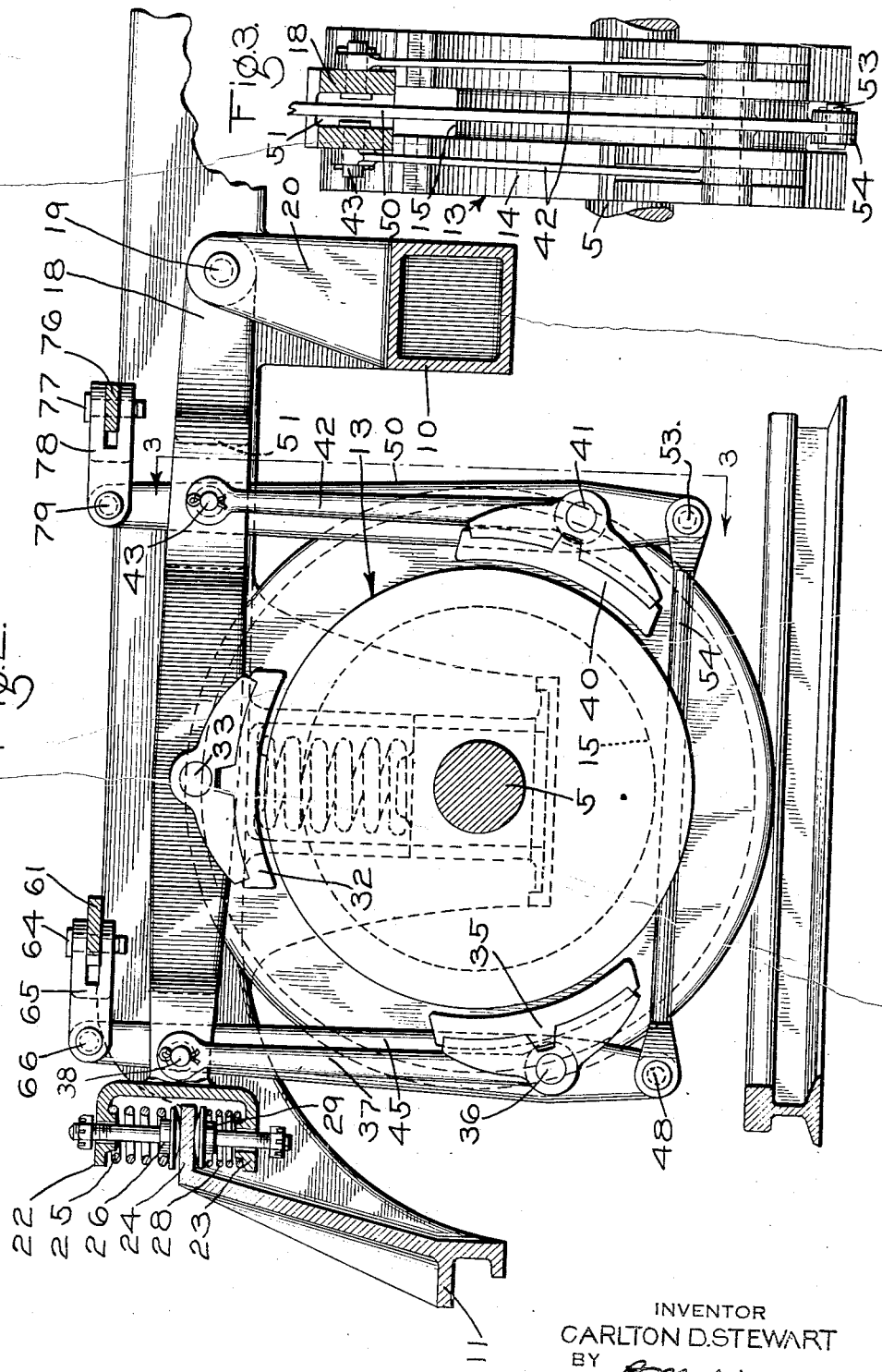
INVENTOR
CARLTON D. STEWART
BY
ATTORNEY Patented Oct. 31, 1939

2,177,957

UNITED STATES PATENT OFFICE 2,177,957

BRAKE MECHANISM

Carlton D. Stewart, Wilkinsburg, Pa., assignor to The Westinghouse Air Brake Company, Wilmerding, Pa., a corporation of Pennsylvania Application December 28, 1938, Serial No. 248,078

11 Claims. (Cl. 188—58)

This invention relates to brakes for railway vehicles, and more particularly to the type embodying clasp brake mechanisms cooperative with brake drums carried by the wheel and axle assemblies of a railway truck.

It has been proposed to provide a railway brake mechanism comprising a brake drum mounted adjacent the wheel of a truck, with a pair of brake shoes operative into braking engagement with the drum below the horizontal center line thereof, and a third brake shoe disposed above the brake drum and connected to the lower shoes, which third shoe is adapted to be drawn against the drum upon application of the other brake shoes, so that the drag and displacement of the brake shoes are utilized to increase the braking force while transmission of such force to the truck frame and consequent overloading of the truck springs are substantially prevented.

A clasp brake equipment of the above type is disclosed in my copending application for a patent filed in the U. S. Patent Office June 18, 1938, Serial No. 214,517, wherein the features of the improved brake are broadly claimed.

It is an object of the present invention to provide a railway clasp brake equipment similar to that shown in the aforementioned patent application, but having in addition certain features of construction embodying automatic slack adjusting means cooperative with other elements of the mechanism to compensate for brake shoe wear and the like.

Another object of the invention is to provide an improved clasp brake mechanism of the above type comprising a brake drum secured to the axle inwardly of the wheel of the truck, three brake shoes engageable with the drum as above explained, and operating means including a brake cylinder device and slack adjuster mounted on the truck frame outboard of the wheel and operatively connected to the shoes by means of a lever mechanism.

Other objects and advantages of the invention will appear in the following more detailed description thereof, taken in connection with the accompanying drawings, wherein Fig. 1 is a fragmentary plan view of one wheel and associated elements of a railway truck embodying a clasp brake equipment constructed according to the invention;

Fig. 2 is a side elevational view, partly in section, and taken substantially along the line 2—2 of Fig. 1; and Fig. 3 is a sectional view taken along the line 3—3 of Fig. 2.

Referring to the drawings, one wheel and axle assembly and the adjacent corner portions of a railway truck frame are illustrated in simplified form for the purpose of disclosing a preferred embodiment of my improved clasp brake equipment. As shown in Fig. 1 of the drawings, there are provided a wheel and axle assembly 5, a journal 6 supported by the axle, and a truck frame including a side portion 7 carried on the journal, and a transversely disposed transom portion 10 and end portion 11.

Secured to the axle 5 adjacent the wheel shown in Fig. 1 is a brake drum 13 having a pair of annular braking faces 14 separated by an annular groove 15. It will be noted that the brake drum 13 is secured to the axle 5 inboard of the adjacent wheel, as best shown in Fig. 1. Disposed horizontally above the brake drum is a carrier member 18, one end of which is pivotally connected to a stud 19 carried by a lug portion 20 of the transom 10, while the other end extends beyond the wheel and toward the end of the truck frame. The outer or free end of the carrier member 18 has formed thereon a pair of vertically spaced spring seat portions 22 and 23, which, when the parts are assembled as shown in Fig. 2, are disposed in alignment with opposite sides of a horizontal bracket or plate portion 24 carried by the end portion 11 of the truck frame. The carrier member 18 is resiliently supported by means of a coil spring 25 which is interposed between the seat portion 22 and a follower member 26 engaging the plate portion 24 of the frame. For resisting upward movement of the carrier member 18 a somewhat lighter coil spring 28 is fitted between the lower seat portion 23 and a follower member 29 which is adapted to abut the lower face of the plate portion 24.

As shown in Fig. 1 of the drawings, the carrier member 18 is provided with a pair of boss portions 31 on which are mounted a pair of brake shoes 32 which are pivotally connected to the carrier member by means of a pin 33. Each of the shoes 32 is operatively aligned with one of the brake surfaces 14 of the brake drum 13. In addition to the brake shoes 32 thus mounted above the brake drum 13, the carrier member 18 is adapted to support a pair of brake shoes 35, the heads of which are connected by means of a transversely disposed pin 36 to suitable hanger members 37 that in turn are pivotally connected by pins 38 to the carrier member, and a pair of brake shoes 40 having their heads connected by means of a pin 41 to parallel hanger members 42 which are pivotally supported from the carrier member 18 by pins 43.

As is best shown in Fig. 2 of the drawings, the associated pairs of brake shoes 35 and 40 are disposed in clasp arrangement on either side of the brake drum 13 and somewhat below the horizontal center line thereof. It will thus be observed that, with reference to the circular drum 13, the brake shoes 35 and 40 are disposed equidistant from the top brake shoes 32 and are adapted to engage the brake drum at points spaced substantially more than 90 degrees on either side of the median points of engagement of the shoes 32 with the drum.

Pivotally connected to the transversely disposed pin 36 is a substantially vertical brake lever 45, the upper end of which extends through a slot 47 formed in the carrier member 18, and the lower and shorter end of which carries a transversely disposed pin 48. A similar brake lever 50 is operatively connected to the pin 41 carrying the brake shoes 40 and extends upwardly through a longitudinal slot 51 formed in the carrier member 18. The lower end of the brake lever 50 is pivotally connected by means of a pin 53 to a longitudinal link member 54 which is disposed within the groove 15 of the brake drum and is pivotally connected to the pin 48 carried by the brake lever 45.

According to the invention, the clasp brake mechanism, while mounted inboard of the adjacent wheel, is adapted to be operated through a suitable lever means by a brake cylinder device 58, which is bolted or otherwise secured to the side frame portion 7 outwardly of the wheel as shown in Fig. 1. The brake cylinder 58 is of the usual type and has a piston rod 59 pivotally connected to a pin 60 which is carried on the outer end of a substantially horizontally disposed brake cylinder lever 61. The inner end of the lever 61 is operatively aligned with the clasp brake mechanism and is pivotally connected by a pin 64 to a link member 65 that is in turn connected by means of a pin 66 to the upper end of the brake lever 45.

The brake cylinder device 58 carries a flange 70 on the closed end thereof, to which flange is bolted an automatic slack adjusting device 71, which may be of any suitable type and in the form shown in Fig. 1 of the drawings comprises a fluid pressure motor 72 operated in accordance with the travel of the piston in the brake cylinder device 58 to rotate a screw member 73, which in turn controls the positioning of a fulcrum element 74. The fulcrum element 74 carries a pin 75 to which is pivotally connected the outer end of a lever 76, which extends transversely of a truck and has its inner end pivotally connected by a pin 77, a link member 78 and a pin 79 to the upper end of a member 50. A tie rod 81 is pivotally connected to the associated levers 61 and 76 intermediate the ends thereof, by means of pins 82 and 83, respectively.

When the brakes are released as shown in Fig. 1 of the drawings, the brake cylinder levers 61 and 76 are initially disposed in somewhat canted positions with respect to the transverse sections of the truck so that upon movement thereof into brake applying positions the levers will assume substantially right angular positions relatively to the longitudinally arranged link members 65 and 78 in order to effect transmission of maximum force exerted through the medium of the piston rod 59 to the clasp brake mechanism.

Operation

When the usual air brake control equipment, not shown, is operated to effect a supply of fluid under pressure to the brake cylinder device 58, the piston therein is actuated to move the piston rod 59 and pin 60 outwardly and thereby to rotate the brake cylinder lever 61 in a clockwise direction about the pin 82, which pin together with the tie rod 81 and pin 83 is at the same time shifted so as to turn the brake cylinder lever 76 in a counterclockwise direction about the pin 75. This operation of the lever 61 effects movement of the link member 65 toward the right, as viewed in the drawings, while the simultaneous operation of the lever 76 causes leftward movement of the link member 78.

It will thus be seen that the vertically disposed brake levers 45 and 50 are actuated to move the brake shoes 35 and 40 into braking engagement with the brake drum 13 below the horizontal center line thereof. As these brake shoes are thus applied with increasing force to the brake drum by continued operation of the brake levers, the shoes are forced toward each other and thus downwardly along the peripheral surface of the brake drum, the downwardly directed force due to such action being transmitted through the hanger members 37 and 42, respectively, to the carrier member 18. The carrier member 18 is thereby moved downwardly, rotating about the pivotal connection with the stud 19 and against the opposing force of the spring 25, so as to move the top pair of brake shoes 32 into engagement with the upper surface of the drum 13. At this time the downward movement of the carrier member and the associated elements of the brake mechanism carried thereby will stop, since the member will now be rigidly supported by both the truck frame and brake drum.

It will thus be seen that when the brake rigging elements are in application position as just explained, the force exerted by operation of the brake cylinder device 58 is transmitted through the medium of the transversely disposed brake cylinder levers 61 and 76 to the clasp brake mechanism which cooperates with the brake drum carried inboard of the wheel, and that the top brake shoes 32 not only serve to support the carrier member 18 and other braking elements, but also materially increase the braking action on the wheel and axle assembly.

In order to effect the release of the brakes, fluid under pressure is discharged from the brake cylinder device 58 by the usual release operation of the air brake control apparatus, and the brake cylinder spring, not shown in the drawing, then becomes effective to return the brake cylinder piston and the piston rod 59 to release position. As the piston rod 59 is thus moved to release position, the associated brake levers 61 and 76 are of course operated to effect return of the brake elements, including the three brake shoes, to their release position, while the spring 25 again becomes effective to provide resilient support for the associated carrier member 18.

It will be understood that sufficient operating clearance will be provided in the operating connections between the levers 45 and 50 and the brake cylinder device and slack adjusting mechanism to permit the necessary vertical movement of the levers with the carrier member 18 relative to the truck frame.

Slack adjusting operation

The slack adjuster device 71 carried with the brake cylinder device 58 on the truck frame outboard of the wheel is adapted to operate automatically to take up slack in the rigging members actuating the brake shoes which are carried inboard of the wheel. Thus if the piston of the brake cylinder device 58 should be moved beyond a predetermined position while an application of the brake shoes to the drum is being effected, whether such excessive piston travel is due to worn brake shoes or otherwise, fluid under pressure is supplied by way of a port in the brake cylinder device uncovered by the piston and a conduit 91 to the motor 72 of the slack adjusting device 71. The motor 72, which is not shown in detail in the drawings, is thereby actuated to an operating position, and upon subsequent release of fluid under pressure from the brake cylinder device 58 and the motor 72 in effecting release of the brakes, the motor becomes operative in the usual manner to turn the screw 73 for shifting the fulcrum member 74 and pin 75 to the right. This change in position of the fulcrum member and pin 75 effects a corresponding change in positioning of the brake shoes connected to the brake levers 45 and 50, the brake shoes being thus brought somewhat closer to the brake drum 13 as will be apparent upon reference to Fig. 1 of the drawings. The brake rigging members are then conditioned to apply the brake shoes to the brake drum during a subsequent operation without requiring excessive movement of the piston of the brake cylinder device 58.

While I have described one embodiment of the invention in detail, it is not my intention to limit its scope to that embodiment or otherwise than by the terms of the appended claims.

Having now described my invention, what I claim as new and desire to secure by Letters Patent, is:

1. In a clasp brake mechanism for a railway truck involving a wheel and axle assembly and a frame having journaled support thereon, a brake drum mounted on the axle inboard of the wheel, a movable carrier member yieldingly supported from the truck frame above said drum, brake shoes hung from said carrier member in braking alignment with said drum below the center thereof, a brake shoe mounted on said carrier member for engagement with the top of said drum, a brake cylinder device mounted on the truck frame outwardly of said wheels, and lever means bridging the wheel and operatively connecting said brake cylinder with said brake shoes.

2. In a clasp brake mechanism for a railway truck involving a wheel and axle assembly and a frame having journaled support thereon, a brake drum mounted on the axle inboard of the wheel, a movable carrier member yieldingly supported from the truck frame above said drum, brake shoes hung from said carrier member in braking alignment with said drum below the center thereof, a brake shoe mounted on said carrier member for engagement with the top of said drum, a brake cylinder device mounted on the truck frame outwardly of said wheel, lever means bridging the wheel and operatively connecting said brake cylinder with said brake shoes, and a slack adjuster device cooperative with said brake cylinder device for adjusting said lever means to compensate for wear.

3. The combination with a railway vehicle truck comprising a truck frame and a supporting wheel and axle assembly, of a pair of braking shoes disposed in clasp relation in said assembly, supporting means carried by said truck frame adapted to support said brake shoes, said supporting means being pivotally connected to the truck frame and movable toward said assembly under the influence of forces set up upon the engagement of said braking means with the assembly, braking means movable by said supporting means into braking engagement with the assembly, and means automatically operative to effect adjustment of said pair of brake shoes with respect to the assembly to compensate for wear.

4. In a clasp brake mechanism for a railway truck involving a wheel and axle assembly and a frame having journaled support thereon: a brake drum mounted on the axle inboard of the wheel, a movable carrier member yieldingly supported on the truck frame above said drum, brake shoes hung from said carrier member in braking alignment with said drum below the center thereof, a brake shoe mounted on said carrier member for engagement with the top of said drum, brake shoe levers cooperative with said brake shoes and carrier member for forcibly applying said shoes to the drum, a brake cylinder device mounted on the truck frame outwardly of said wheel, and a pair of operatively connected brake cylinder levers disposed transversely of the truck and bridging said wheel for communicating movement of said brake cylinder device to said brake shoe levers.

5. In a clasp brake mechanism for a railway truck involving a wheel and axle assembly and a frame having journaled support thereon, a brake drum mounted on the axle inboard of the wheel, a movable carrier member yieldingly supported on the truck frame above said drum, brake shoes suspended from said carrier member in braking alignment with said drum below the center thereof, another brake shoe mounted on said carrier member for engagement with the top of said drum, brake shoe levers cooperative with said brake shoes and carrier member for forcibly applying said shoes to the drum, a brake cylinder device, a pair of operatively connected brake cylinder levers disposed transversely of the truck and bridging said wheel for communicating movement of said brake cylinder device to said brake shoe levers, and a slack adjuster device automatically operative to position the fulcrum pivot of one of said brake cylinder levers to maintain relatively constant brake shoe travel.

6. In a clasp brake mechanism for a railway truck involving a wheel and axle assembly and a frame having journaled support thereon, a brake drum mounted on the axle inboard of the wheel, a movable carrier member having longitudinal apertures and yieldingly supported on the truck frame above said drum, a pair of brake shoes hung from said carrier member in clasp relation with said drum below the center thereof, a brake shoe mounted on said carrier member for engagement with the top of said drum, a pair of vertically disposed brake shoe levers pivotally connected intermediate their ends to the clasp brake shoes, respectively, and having their lower ends connected to a common tie rod and their upper ends projecting through the apertures in said carrier member, a brake cylinder device mounted on the truck frame outwardly of the truck wheel, and lever means bridging said wheel and operative by said brake cylinder for simultaneously forcing the upper ends of said brake shoe levers toward each other to effect application of the brakes.

7. In a clasp brake mechanism for a railway truck involving a wheel and axle assembly and a frame having journaled support thereon, a brake drum mounted on the assembly inboard of the wheel, a movable carrier member yieldingly supported on the truck frame above said axle, brake shoes carried by said carrier member in braking alignment with said drum below the center thereof, another brake shoe mounted on said carrier member for engagement with the top of said drum, brake shoe levers cooperative with said brake shoes and carrier member for forcibly applying said shoes to the drum, the upper ends of said levers extending through and above said carrier member, a brake cylinder device, a pair of operatively connected brake cylinder levers located above said carrier member and extending transversely of the truck connecting said brake cylinder device to said brake shoe levers for communicating movement of said brake cylinder device to said brake shoe levers, and a slack adjuster device automatically operative to position the fulcrum pivot of one of said brake cylinder levers to maintain relatively constant brake shoe travel.

8. In a clasp brake mechanism for a railway truck involving a wheel and axle assembly and a frame having journaled support thereon, a brake drum mounted on the assembly inboard of the wheel, a movable carrier member yieldingly supported on the truck frame above said axle, brake shoes carried by said carrier member in braking alignment with said drum below the center thereof, another brake shoe mounted on said carrier member for engagement with the top of said drum, brake shoe levers cooperative with said brake shoes and carrier member for forcibly applying said shoes to the drum, a brake cylinder device operatively connected to the upper end of one of said brake shoe levers, a slack adjuster device secured to the truck frame outboard thereof, and a fulcrum lever operatively connecting said slack adjuster device to the upper end of the other brake shoe lever.

9. A brake mechanism for a railway vehicle truck comprising a wheel and axle assembly and a truck frame supported on said assembly, said brake mechanism comprising a pair of clasp arranged brake shoes arranged at opposite sides of said assembly and below the center thereof, a third brake shoe arranged above said assembly, a leverage system for actuating said clasp shoes and thereby said third brake shoe into braking engagement with said assembly, actuating means connected to one end of said leverage system, and a slack adjuster device secured to said truck frame and operatively connected to the other end of said system.

10. A brake mechanism for a railway vehicle truck comprising a wheel and axle assembly and a truck frame supported on said assembly, said brake mechanism comprising inboard of said truck frame a pair of clasp arranged brake shoes arranged at opposite sides of said assembly and below the center thereof, a third brake shoe arranged above said assembly, a leverage system for actuating said clasp shoes and thereby said third brake shoe into braking engagement with said assembly, actuating means connected to one end of said leverage system, and a slack adjuster device secured to said truck frame outboard thereof and operatively connected to the other end of said system.

11. A brake mechanism for a railway vehicle truck comprising a wheel and axle assembly and a truck frame supported on said assembly, said brake mechanism comprising a pair of clasp arranged brake shoes arranged at opposite sides of said assembly and below the center thereof, a third brake shoe arranged above said assembly, a leverage system for actuating said clasp shoes and thereby said third brake shoe into braking engagement with said assembly, a slack adjuster device connected to one end of said system providing a fulcrum therefor, and actuating means connected to said system for actuating said system to move said shoes into braking relation with said assembly.

CARLTON D. STEWART.